(12) United States Patent
Khandhar et al.

(10) Patent No.: US 12,531,920 B2
(45) Date of Patent: Jan. 20, 2026

(54) GAZE-BASED COPRESENCE SYSTEM

(71) Applicant: Apple Inc., Cupertino, CA (US)

(72) Inventors: Jay Mayur Khandhar, Milpitas, CA (US); Borna Ghavam, San Francisco, CA (US); Jinbo Qiu, San Jose, CA (US); Christopher M. Garrido, Santa Clara, CA (US); Karthick Santhanam, Campbell, CA (US); Patrick Miauton, Redwood City, CA (US); Xiaosong Zhou, Campbell, CA (US); Dazhong Zhang, Saratoga, CA (US); Kristian D. Pereira, San Jose, CA (US); Dan Miao, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/600,378

(22) Filed: Mar. 8, 2024

(65) Prior Publication Data
US 2024/0305682 A1    Sep. 12, 2024

Related U.S. Application Data

(60) Provisional application No. 63/489,314, filed on Mar. 9, 2023.

(51) Int. Cl.
*G06F 15/16* (2006.01)
*G06F 3/01* (2006.01)
*G06T 13/40* (2011.01)
*G06V 10/25* (2022.01)
*H04L 65/75* (2022.01)

(52) U.S. Cl.
CPC ............ *H04L 65/762* (2022.05); *G06F 3/013* (2013.01); *G06T 13/40* (2013.01); *G06V 10/25* (2022.01)

(58) Field of Classification Search
CPC ....... H04L 65/762; G06V 10/25; G06F 3/013; G06T 13/40
USPC ........................................................... 709/231
See application file for complete search history.

(56) References Cited

U.S. PATENT DOCUMENTS

| | | | | |
|---|---|---|---|---|
| 8,233,026 B2* | 7/2012 | Sylvain | .......... | H04N 21/234327 348/14.1 |
| 8,441,486 B2* | 5/2013 | Gower | .................. | H04L 67/131 715/706 |
| 9,007,362 B2* | 4/2015 | Shuster | ..................... | G06F 3/00 345/473 |
| 9,203,880 B2* | 12/2015 | Gower | ..................... | A63F 13/30 |
| 9,424,688 B2* | 8/2016 | Maaradji | ................. | G06F 3/011 |
| 11,159,848 B2* | 10/2021 | Ju | ......................... | H04N 21/433 |

(Continued)

FOREIGN PATENT DOCUMENTS

EP            0696018 B1    6/2001

*Primary Examiner* — Moustafa M Meky
(74) *Attorney, Agent, or Firm* — Blank Rome LLP (57) ABSTRACT

A technique for transmitting data in a copresence environment includes initiating a virtual communication session between a local device and remote devices in a shared copresence environment, where each of the plurality of sending devices are transmitting a sending quality data stream in the virtual communication session. A region of interest for the local device is determined that includes a portion of the copresence environment. The local device subscribes to a first quality data stream for the remote devices represented in the region of interest, and a second quality data stream for the remote devices not represented in the region of interest.

19 Claims, 6 Drawing Sheets

(56) References Cited

U.S. PATENT DOCUMENTS

| | | | | |
|---|---|---|---|---|
| 11,656,682 | B2* | 5/2023 | Roberts | H04N 21/4621 |
| | | | | 345/156 |
| 11,694,438 | B2* | 7/2023 | Rowe | G06T 15/10 |
| | | | | 709/204 |
| 12,112,773 | B2* | 10/2024 | Levin | G06F 3/04815 |
| 12,124,761 | B2* | 10/2024 | Feldman | H04L 65/611 |
| 12,134,034 | B2* | 11/2024 | Perry | A63F 13/35 |
| 2018/0160160 | A1* | 6/2018 | Swaminathan | H04N 21/816 |
| 2018/0341323 | A1* | 11/2018 | Mate | A63F 13/355 |
| 2019/0130631 | A1* | 5/2019 | Gebbie | G06F 3/012 |
| 2019/0279417 | A1* | 9/2019 | Castaneda | G06T 19/006 |
| 2020/0064907 | A1* | 2/2020 | Luo | G06F 3/017 |
| 2020/0133610 | A1* | 4/2020 | Vlachou | G06T 15/04 |
| 2021/0346799 | A1* | 11/2021 | Perry | A63F 13/355 |
| 2021/0368148 | A1* | 11/2021 | Ma | H04L 65/756 |
| 2022/0004254 | A1* | 1/2022 | Roberts | H04N 21/234363 |
| 2022/0262079 | A1* | 8/2022 | Croxford | G06T 15/20 |
| 2022/0286311 | A1 | 9/2022 | Rowe | |
| 2023/0061935 | A1* | 3/2023 | Benedicto | G06V 10/60 |
| 2023/0213764 | A1* | 7/2023 | Arngren | G02B 27/0093 |
| | | | | 345/8 |
| 2024/0005622 | A1 | 1/2024 | Lee | |
| 2024/0037837 | A1* | 2/2024 | Krol | H04N 7/157 |
| 2024/0283901 | A1* | 8/2024 | Jang | H04N 21/81 |

\* cited by examiner

GAZE-BASED COPRESENCE SYSTEM

FIELD OF THE INVENTION

This disclosure relates generally to image processing. More particularly, but not by way of limitation, this disclosure relates to techniques and systems for improving power and data usage in transmitting avatar data.

BACKGROUND

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. Some XR environments allow multiple users to interact with each other within the XR environment. However, transmitting such avatar data can be computationally expensive.

DETAILED DESCRIPTION

Embodiments described herein relate to a technique for generating and transmitting avatar data. In particular, embodiments described herein described technique for manipulating avatar data on a sender device for efficiency, where the avatar is provided to a server at different quality level dependent upon a gaze of a user of a receiver device.

Techniques described herein relate to a method, system, and computer readable medium for efficiently representing avatar data based on a region of interest at a receiving device. In particular, techniques described herein include, in a virtual communication session, determining a region of interest at a receiving device based on a gaze direction of a user of the receiving device. Then, one or more remote users are identified that are represented within the region of interest. For those remote devices represented in the receiver device's region of interest, a first quality data stream is requested. For example, a data stream having avatar data for a corresponding user to the sender device may be requested at a high quality level. One or more remote devices active in the virtual communication session but not represented in the region of interest may be identified, and a lower quality data stream may be requested for those sender devices. As such, the receiver device may receive a full quality data stream for avatar data of an avatar at which the user of the receiver device is viewing, while avatar data for avatars outside the region of interest are generated using lower quality data streams.

Techniques described herein are associated with various technical improvements. For example, techniques described herein reduce the total data being transmitted to the receiving device only transmitting old data streams for avatar data where the avatar is represented in the region of interest. Moreover, power requirements are reduced at the receiver device. For example, by reducing the frame rate of avatar data received from some of the remote sender devices, the receiver device requires less resources for processing the received image data. Because a virtual communication session may include numerous users, the technical improvements are multiplied. For example, overall bandwidth requirements are reduced by reducing the quality of the data transmission for some of the hairs of devices.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, it being necessary to resort to the claims in order to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not necessarily be understood as all referring to the same embodiment.

It will be appreciated that, in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time consuming but would nevertheless be a routine undertaking for those of ordinary skill in the design and implementation of multi-modal processing systems having the benefit of this disclosure.

Various examples of electronic systems and techniques for using such systems in relation to various technologies are described.

A physical environment, as used herein, refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust the characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1:
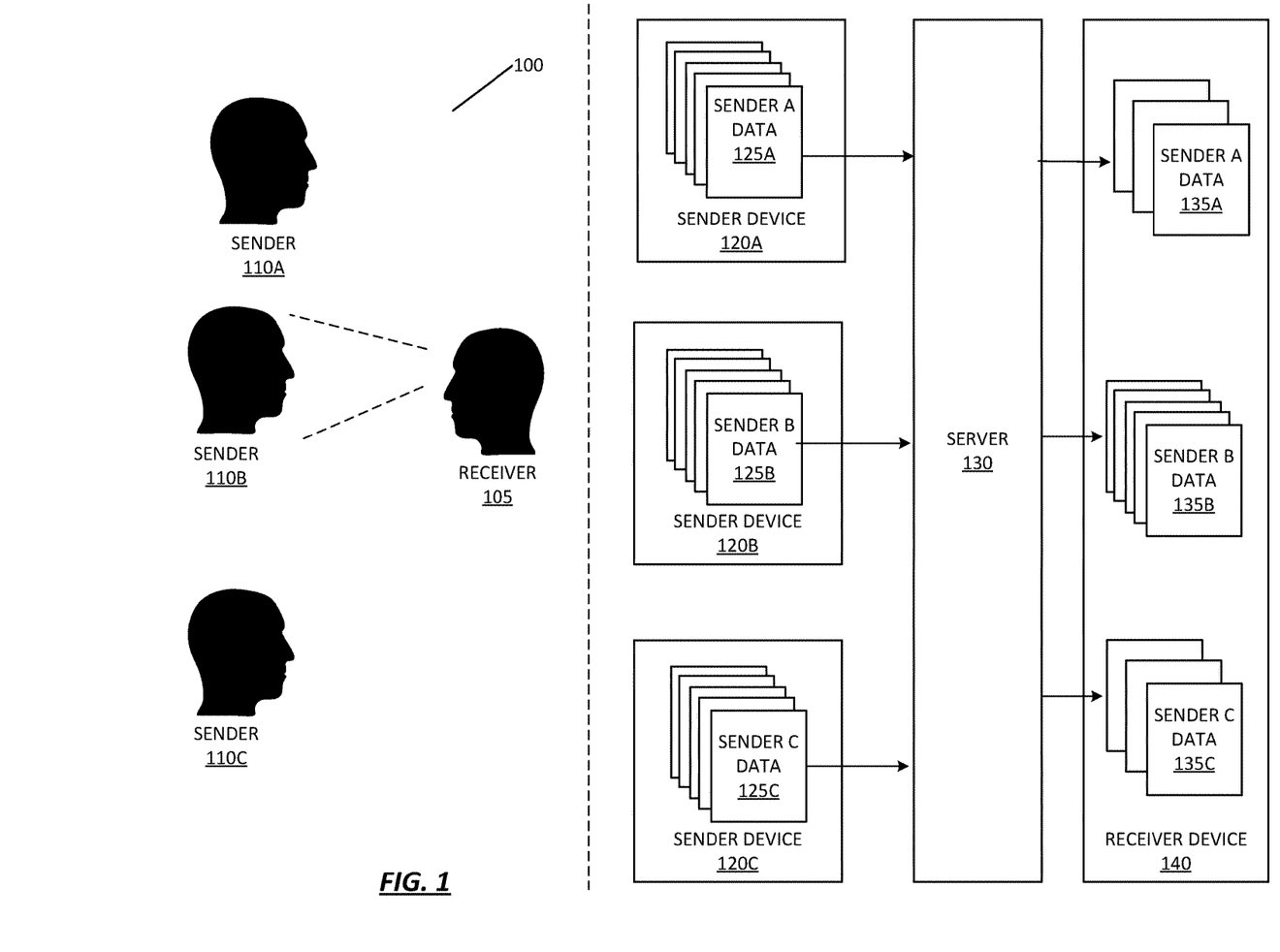
FIG. 1 shows a flow diagram of a technique for transmitting avatar data to a receiving device, according to one or more embodiments.

FIG. 1 shows an example diagram of a technique for selectively transmitting different qualities of data within a virtual communication session, in accordance with one or more embodiments. In particular, the diagram of FIG. 1 shows an example virtual communication session 100 in which a receiver 105 interacts with three senders 110A, 110B, and 110C. In particular, the various senders 110A, 110B, and 110C may be associated with devices transmitting avatar data representative of the corresponding user. Avatar data may include, for example, data from which a receiver device can reconstruct a visual representation of a user of the sender device. As an example, avatar data may include data to generate a face texture, an alpha component, a depth component, and/or pose data. In some embodiments, avatar data is transmitted in the form of video image data, such as a series of image frames. It should be understood that each of these users may be associated with devices sending and receiving data. For example, in a copresence application with multiple devices, each device may encode and transmit an avatar representation to each other device (and, thus, also receive and decode avatar representation from each other device). In some embodiments, the sender device 110 and the receiver device 105 may be interacting in an extended reality (XR environment), such as a copresence session, communication session, or the like. For example, receiver 105 may be associated with a device receiving avatar data from devices corresponding to sender 110A, sender 110B, and sender 110C, as well as sending its own avatar data to each of the devices corresponding to senders 110A, 110B, and 110C. Similarly, the devices corresponding to senders 110A, 110B, and 110C may receive avatar data from a device corresponding to receiver 105. However for purposes of clarity, this description will be described with respect to a particular receiver 105, in relation to senders in the virtual communication session.

According to one or more embodiments, each sender is associated with a sender device. For example, sender 110A is associated with sender device 120A, sender 110B is associated with sender device 120B, and sender 110C is associated with sender device 120C. In some embodiments, each of the sender devices 120A, 120B, and 120C may transmit sender data, such as avatar data, to a receiver device 140. In some embodiments, the receiver device 140 is a device associated with receiver 105.

In some embodiments, a central server 130 may be used to manage transmissions between the sender devices 120 and receiver device 140. For example, as presented, each sender device 120 can transmit sender data of the first quality level to a server 130. From there, the server 130 can determine a quality level at which to transmit the sender data to the receiver device 140. In doing so, the sender device 120 does not need to make a determination as to what quality level to transmit its own data to a particular receiver device. Rather, the server 130 determines and manages the various transmissions among the virtual communication session. As such, the sender devices 120 can transmit a single sender data stream at a single quality level.

In the current example virtual communication session 100, receiver 105 is viewing sender 110 B. As such, receiver device 140 (associated with receiver 105) may request sender B data 125 the from sender 120B (associated with sender 120B) at a first quality level. For example, the receiver device may request the avatar data for sender 110B at a high quality level relative to the avatar data were avatar is not within the region of interest, such as sender 110A and sender 110C. In some embodiments, the first quality level may be associated with an original quality level at which the sender be data 105 is generated by sender device 120. By contrast, because sender 110A and sender 110 Care outside the region of interest in the virtual communication session 100, the receiver device 140 may receive a reduced quality level for the sender A data 125A from sender device 120A (associated with sender 110A), and sender C data 125C generated by sender device 120C (associated with sender 110C). As such, receiver device 140 is depicted as having received a reduced frame rate for sender A data 135A and a reduced frame rate of sender C data 135C. However, receiver device 140 has received a full frame rate for sender B data 135B.

In some embodiments, receiver device 140 may receive the different data transmissions from the sender devices based on a requested quality level or the sender data. In some embodiments, the receiver device 140 may request the quality level for a given data transmission based on whether or not a user represented by the device is represented within a region of interest. The region of interest may be determined based on a gaze direction of the receiver, such as receiver 105. In some embodiments, receiver device 140 may be enabled with eye tracking technology, including one or more sensors from which a gaze vector or other gaze information or eye tracking data may be determined. The gaze information may be used to determine the region of interest. As an example, the region of interest may include a portion of the graphical representation of virtual communication session at which the receiver's attention is focused. This may be determined based on a gaze information or other contextual information in the virtual communication session (active content and the like). For example, a field of view, or a portion of a field-of-view, of the receiver 105 can be determined based on the gaze information and used as the region of interest. A determination may be made as to whether a particular sender is within the region of interest or not. For those senders within the region of interest, such as sender 110B, a request may be made for avatar data or other data generated by the associated sender device to be transmitted at a first quality level. By contrast, if a particular sender is not within the region of interest, a request may be made for avatar data or other data generated by the associated sender device to be transmitted at a second quality level, which may be lower than the first quality level.

In some embodiments, the request may be transmitted directly to the sender devices, or may be transmitted to the central server 130, which may manage the data transmissions. In some embodiments, a server 130 may be configured to receive sender data, such as sender A data 125A, sender B data 125B, and sender C data 125C at a first quality level, and generate data streams for the receiver device 140 at a requested quality level. For example, in some embodiments, a frame rate of the sender data may be reduced by dropping frames from the sender data prior to transmission to a receiver device. In some embodiments, the technique for reducing the frame rate of sender data may be enhanced by the sender device preemptively marking the frames of the sender data in such a manner such that the server 130 can identify which frames should be dropped to reach a particular predetermined frame rate. For example, the virtual communication session may be associated with a set of predefined frame rates for quality levels, and sender device 120 may preemptively indicate to server 130 which frames should be dropped and/or how to determine which frames to drop to reach each of the target quality levels for the virtual communication session.

Figure 2:
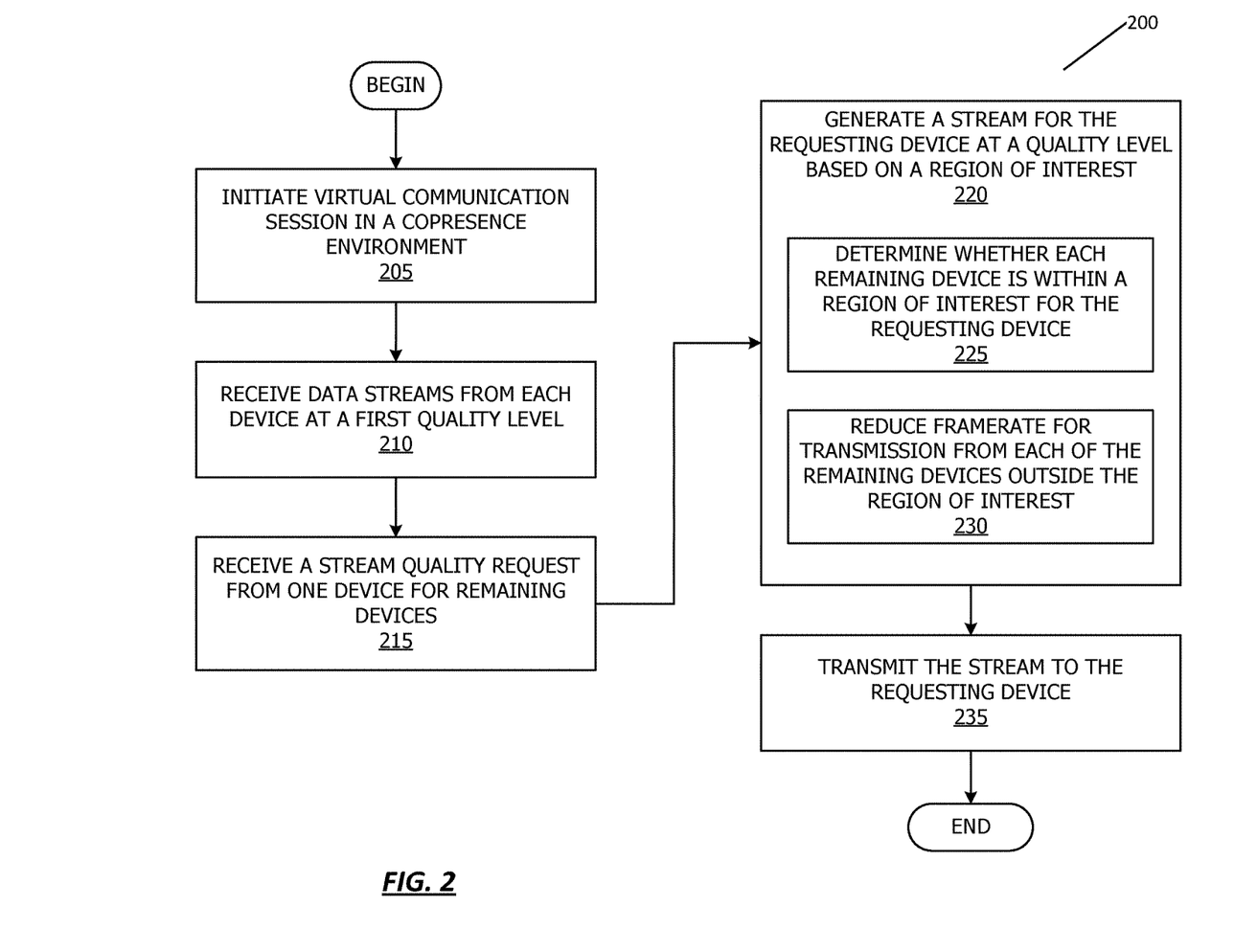
FIG. 2 shows a flowchart of a technique for selectively transmitting different qualities of avatar data, according to one or more embodiments.

FIG. 2 shows a flowchart of a technique for selectively transmitting different qualities of avatar data, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 200 begins at block 205, where a virtual communication session is initiated in a copresence environment. As described above, the virtual communication session may be presented at a local device in an extended reality environment in which multiple users are communicating with common virtual objects from different physical devices. As such, the users can be located in a same location, or in remote locations, or some combination thereof. A virtual communication session may include at least some of the users sharing content with the others. For example, the users can share avatar data representative of the users of the devices such that the virtual representations of the users are presented in a common configuration across the devices in the virtual communication session. In addition, the virtual communication session may include common virtual objects and applications by which the users can interact with or view in the virtual environment. In some embodiments, the virtual communication session may be presented in the form of the augmented reality environment, virtual reality environment, or other extended reality environment.

The flowchart 200 continues at block 210, where data streams are received from each device at the first quality level. According to some embodiments, a central server may receive the data streams from each device at the first quality level. These data streams may include, for example, avatar data representative of the users from which the data streams are received. That is, the data streams may be used to convey to a receiving device how to render a graphical representation of the user associated with the device transmitting the data such that at least some characteristics of the user's appearance or reactions are conveyed by the avatar data. The data streams may additionally, or alternatively, include other data, such as user interface content, media items, and the like. In some embodiments, the data streams may be received at a same quality level from all devices, or from in different quality levels. For example, a user communicating in the virtual communication session from a device with significant computing resources may be able to generate and stream data at a higher quality level than, for example, a device having limited resources.

As described above, in some embodiments, the data streams may be received in the form of a video data stream comprising a series of frames. In this embodiment, the initial quality level may be associated with a particular frame rate. This initial frame rate may be a global initial frame rate from which each sender is expected to transmit the sender data. Alternatively, the initial frame rate may be specific to the device, for example when the original quality levels are different among devices.

The flowchart 200 continues at block 215, where a stream quality request is received from one device for data streams from the remaining devices. As described above, in the example of a copresence environment, each device may be sending and receiving data. However, for clarity purposes, in this description the technique is described with respect to a particular device receiving data generated by the other devices in the virtual communication session. As will be described below, the stream quality request may be based on whether a particular device's data is represented in within a region of interest with respect to the requesting device. The stream quality request may be based on other parameters, such as whether a receiving device can handle a high-quality stream based on resource availability, or the like. The stream quality request may indicate a quality level at which the receiver device would like to receive a sender data stream. As such, a quality request may indicate a quality level for multiple sender devices in the communication session, or multiple quality requests can be received by the server.

The flowchart 200 continues at block 220, where a data stream is generated for the requesting device at a quality level based on a region of interest. As described above, a data stream may be generated for each of the devices in the virtual communication session for which a data stream is requested. Thus, the stream may include, for example, avatar data or other media data to be presented in the virtual communication session. In some embodiments, the request may be received for a device represented within a region of interest with respect to the receiving device. As such, the request may be associated with a high-quality data stream request. According to some embodiments, the data stream may indicate how to generate data streams a reduced quality levels for the particular data stream. As an example, a sender may transmit an indication of frames to be dropped in order to reach a particular one or more quality levels. This may be performed, for example, in a header file for the data stream, by marking individual frames, or the like. In some embodiments, the sender devices may transmit the data with the indication for one or more target quality levels. The target quality levels may be global target quality levels, such as predefined frames per second or the like. Alternatively, the target quality levels may be defined with respect to the original quality level of the transmission. For example, a reduced quality level may include dropping every other frame from the original quality level despite the frame rate of the original transmission.

In some embodiments, the server may determine the remainder of the devices active in the virtual communication session for which the request is not received. That is, if a receiving device does not specify a particular sender device that has been identified in the region of interest, the server can identify the remainder of the devices, and determine to send a lower quality data stream to those devices. As such, at block 225, the server determines whether each of the remaining devices is then the region of interest for the requesting device. Then, at block 230, the server reduces the frame rate for the transmission from each of the remaining devices outside the region of interest. This may be based on the determination at the server, a request from the receiving device, or the like.

The flowchart 200 concludes at block 235, where the central server transmits the stream to the requesting device. As described above, the stream may be specific to a particular sending device, and the central server may transmit streams to the requesting device for each of the other devices (or one or more additional devices) active in the virtual communication session.

Figure 3:
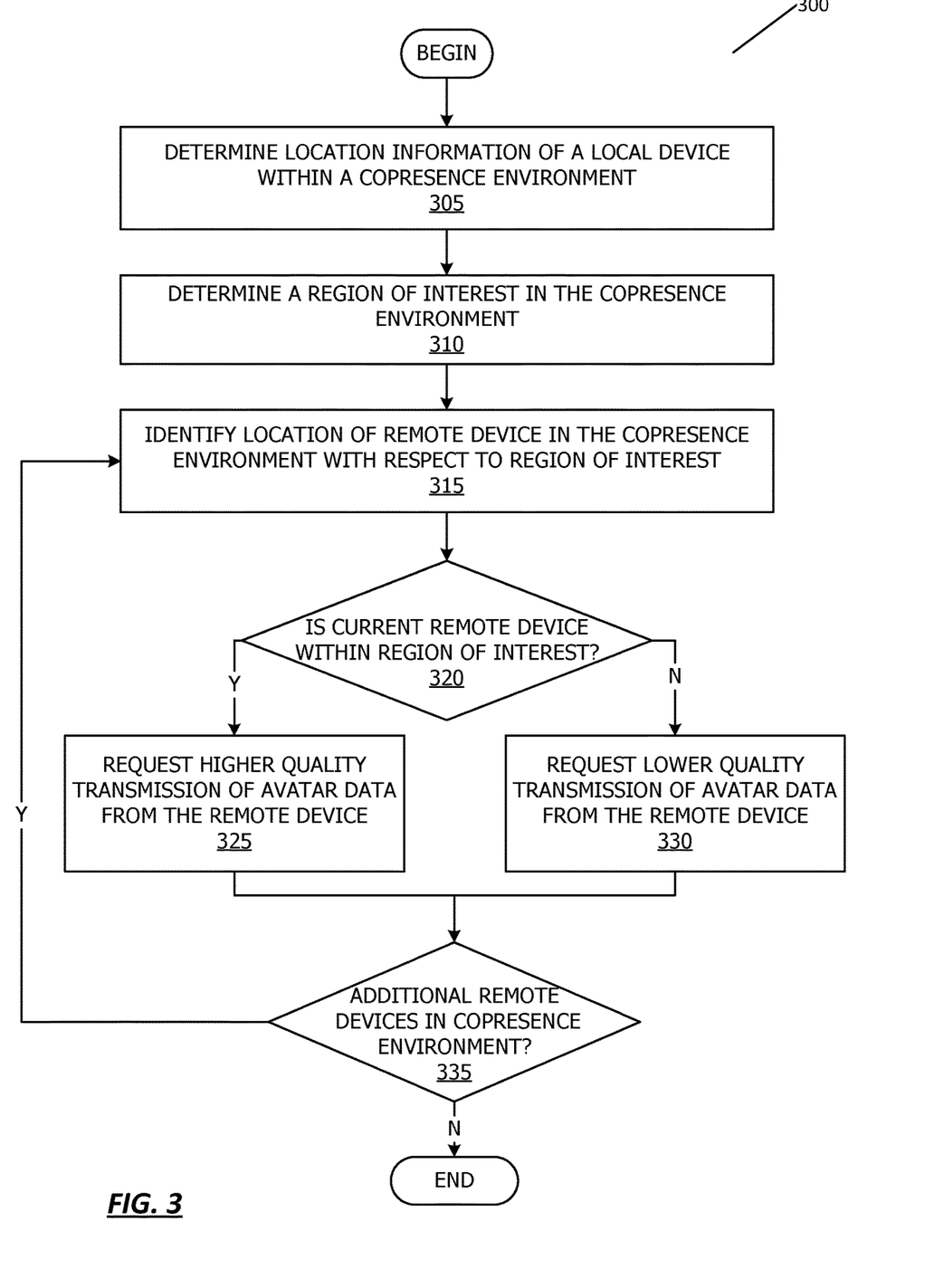
FIG. 3 shows, a diagram of a technique to selectively request different qualities of avatar data, in accordance with one or more embodiments.

FIG. 3 shows, a diagram of a technique to selectively request different qualities of avatar data, in accordance with one or more embodiments. According to one or more embodiments, the techniques described in FIG. 3 are performed by a receiver device. However, it should be understood that the various functionality may be performed by additional and/or alternative devices. In addition, the various actions may be performed in a different order. Further, some actions may be performed simultaneously, and some may not be required, or others may be added, according to various embodiments.

The flowchart 300 begins at block 305, where location information is determined for a local device (i.e., a receiver device) within a copresence environment. According to some embodiments, the local device may be associated with a particular location or set of coordinates from which a representation of a user of the local device is visible to other users in the shared copresence environment. In some embodiments, the location information may be associated with coordinates within the virtual copresence environment, or may be associated with other location information from which a relative position and/or orientation of the device is determinable among the shared virtual items in the copresence environment.

The flowchart 300 proceeds to block 310, where a region of interest is determined for the local device in the copresence environment. As described above, in some embodiments, the region of interest may be determined based on a portion of the copresence environment at which a user's attention is directed. The region of interest may be determined, for example, based on a gaze information for a local user, active content within the copresence environment, or the like. In some embodiments, the region of interest may be associated with a field-of-view or a portion of the field of view of the copresence environment from the point of view of the local device. The determination of the region of interest will be described in greater detail below with respect to FIG. 4.

At block 315, the flowchart 300 includes identifying a location of one or more remote devices in the copresence environment respect to the region of interest. For purposes of the flowchart 300, the location of the remote devices will be determined one at a time. However, it should be understood that the location of the remote devices may the identified concurrently. According to one or more embodiments, the location of the remote device in the copresence environment may be identified to determine whether the representation of a user of the remote device is present in the region of interest. As another example, the location of the remote device in the copresence environment may be identified based on a presentation of content provided by the remote device within the copresence environment.

The flowchart continues to block 320, where a determination is made as to whether the current device is within the region of interest. More specifically, a determination is made as to whether content provided by the remote device is represented within the region of interest from the perspective of the receiving device (i.e., the local device). According to some embodiments, determining whether the current device is within a region of interest may include determining a relative prominence of the remote devices. For example, rather than the region of interest being defined as a region in space or in the environment, the region of interest may be defined based on a remote device being more closely located in a line of sight to a user. That is, a first remote device most closely located to a user's line of sight may be considered in a first region of interest, whereas a second remote device located less prominently (i.e., not as close to the user's line of sight) may be determined to be outside the region of interest, or within a second region being associated with a different quality level than the region of interest. As another example, a first remote device located closer to the user (i.e., based on depth data) may be considered more prominent than a second remote device further away from the user even if both are within a same region of interest. As such, a relative prominence score may be determined for each of the plurality of sending devices.

If the current device is within the region of interest, then the flowchart continues to block 325, where a higher-quality transmission of the avatar data (or other sender device data) is requested from the remote device. As described above, the higher-quality transmission may include an original quality transmission of the data stream. Additionally, or alternatively, the higher-quality transmission may be a predefined quality from a set of qualities available to the local device. According to one or more embodiments, the higher-quality transmission may be requested by the local device subscribing to a higher-quality transmission for the remote device from a central server.

Similarly, returning to block 320, if the current remote device is not determined to be within the region of interest, then the flowchart continues to block 330, where a lower quality transmission of the avatar data (or other sender device data) be requested from the remote device. As described above, the lower quality transmission may include data which has been downsampled or otherwise reduced by a central server. For example, the lower quality data stream may include a reduced frame rate, and may be produced by a central server by dropping predefined frames from a data stream provided by the current remote device. According to one or more embodiments, the lower-quality transmission may be requested by the local device subscribing to a lower-quality transmission for the remote device from a central server.

According to some embodiments, the different quality levels may be associated with different data types. For example, the higher and lower quality transmissions may be associated with different types of data. For example, a higher quality transmission may include 3D image data, while a lower quality transmission may include 2D image data. As another example, in some embodiments a higher quality transmission may include additional data types than a lower quality data stream. For example, a higher quality data stream may include image data and audio data, whereas a lower quality data stream may only include audio data.

In some embodiments, the quality level selected for transmission may be based on multiple factors or signals. For example, the quality transmission selected may be based on a combination (or weighted combination) of signals such as presence within a region of interest (or other identified regions), relative prominence among remote devices, and/or transmission quality available at the remote devices.

The flowchart 300 continues at block 335, where a determination is made as to whether additional remote devices are in the copresence environment. If so, then the flowchart returned to block 315, and the location of the next remote device in the copresence environment is determined. This process occurs for each of the remote devices until all remote devices have been accounted for. In some embodiments, the additional remote devices at 335 may only include remote devices within a field-of-view or otherwise known to the local device.

Although only a higher and lower quality transmission are described with respect to FIG. 3, it should be understood that in other embodiments, numerous other permutations of different quality transmissions may be provided. For example, in some embodiments, a central server may receive from a sender device, two transmissions, where one of the transmissions is configured to be reduced if required by a requesting device. The two received transmissions may be of a same or different quality. Moreover, in some embodiments, the central server may be configured to reduce a data stream to a lower quality in numerous ways, thereby providing multiple quality levels of data streams which can be requested by receiving devices.

According to one or more embodiments, the processes described with respect to flowchart 300 may be repeated upon detection of a change of spatial configuration of the local device and/or one or more remote devices in the copresence environment. For example, if a position and or orientation of the local device changes, then a region of interest of the copresence environment may also change. As such, the remote devices represented within the new region of interest may be different. Accordingly, the local device may subscribe to different quality transmissions for the various remote devices based on the relative spatial configuration of the local device to the one or more remote devices.

Figure 4:
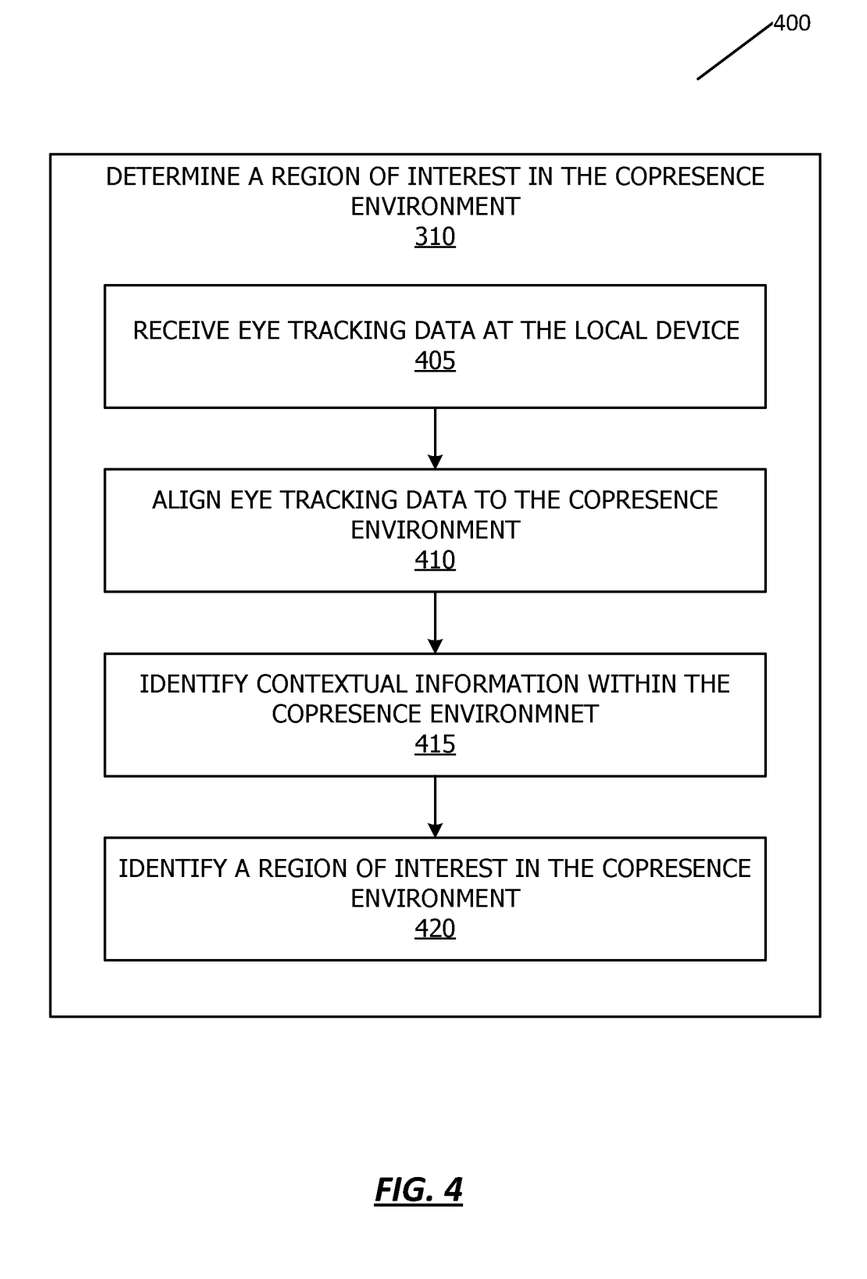
FIG. 4 shows a flowchart of a technique for determining a region of interest, according to one or more embodiments.

FIG. 4 shows a flowchart of a technique for determining a region of interest, according to one or more embodiments. According to one or more embodiments, the techniques described in FIG. 4 are performed by a receiver device. However, it should be understood that the various functionality may be performed by additional and/or alternative devices. In addition, the various actions may be performed in a different order. Further, some actions may be performed simultaneously, and some may not be required, or others may be added, according to various embodiments.

The flowchart 400 depicts a set of processes which may be performed to determine a region of interest in the copresence environment, as described above with respect to block 310 of FIG. 3. The flowchart 400 begins at block 405, where eye tracking data is received at the local device. According to one or more embodiments, the local device may include one or more sensors from which eye tracking data may be obtained. This may include, for example, user facing cameras and/or other sensors from which a user's gaze may be determined.

The flowchart 400 continues at block 410, where the eye tracking data is aligned to the shared copresence environment. According to one or more embodiments, the eye tracking data may be aligned to the shared copresence environment by determining a gaze vector originating at the user of the local device, and projecting out into the copresence environment in the direction according to the user's determine gaze.

The flowchart 400 continues to block 415, where contextual information is identified within the copresence environment. According to some embodiments, the region of interest may consider gaze direction as well as other factors, such as active content within the user environment. An example may be a user interface projected in the environment which contains content with which the user is interacting.

The flowchart 400 concludes at block 420, where the region of interest is determined in the copresence environment. The region of interest may be based on the gaze vector, contextual information, and the like. The region of interest may be a portion of a field-of-view of the user of the remote device within the copresence environment. The region of interest may be of a set size or may be dynamic based on context of activity in the copresence environment. For example, if there are multiple active regions in the copresence environment, a region of interest may be larger than if there is a single active region, or if a user is interacting or directing their attention to a single active component within the environment.

According to one or more embodiments, more than one region of interest may be identified. For example, a first region may be a targeted region based on eye tracking data, and a second region may be within a field of view but outside the target of the eye tracking data, such as surrounding the first region of interest. Additional regions may be determined, for example, in the periphery. The various regions may be associated with different quality levels. For example, depending upon which region a remote device is located, a quality level will be requested accordingly. Further, in some embodiments, transmission may not be requested at all when a remote device is in a particular region, such as if the remote device is in a periphery region or not visible.

Figure 5:
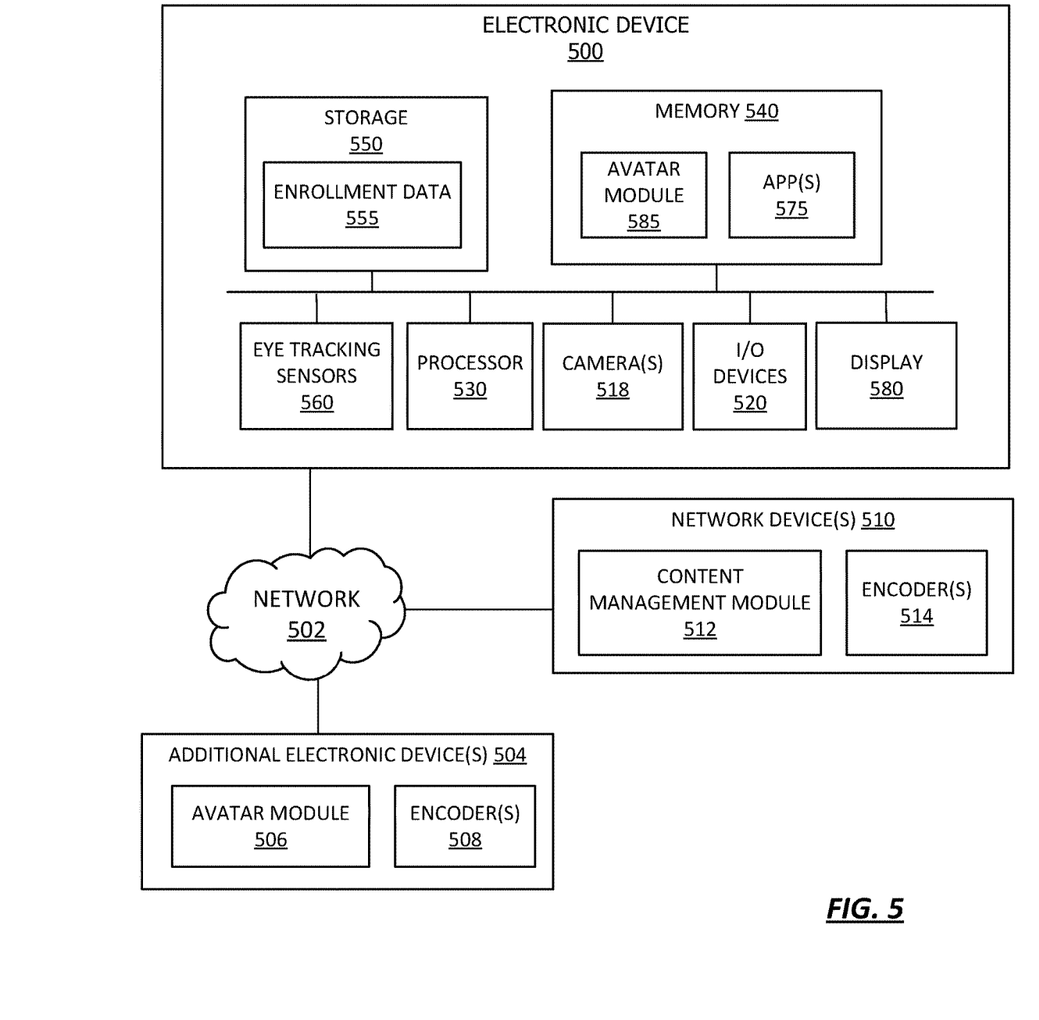
FIG. 5 shows, in block diagram form, an example network diagram, according to one or more embodiments.

FIG. 5 depicts a network diagram for a system by which various embodiments of the disclosure may be practiced. Specifically, FIG. 5 depicts an electronic device 500 that is a computer system having XR capabilities. Electronic device 500 may be part of a multifunctional device, such as a mobile phone, tablet computer, personal digital assistant, portable music/video player, wearable device, head-mounted system, projection-based system, base station, laptop computer, desktop computer, network device, or any other electronic system such as those described herein. Electronic device 500 may be connected to other devices across a network 502 such as additional electronic device(s) 504, and/or accessory electronic devices, mobile devices, tablet devices, desktop devices, or remote sensing devices.

Referring to FIG. 5, a simplified block diagram of an electronic device 500 is depicted, communicably connected to a one or more additional electronic device(s) 504, in accordance with one or more embodiments of the disclosure. Electronic device 500 and additional electronic device(s) 504 may each be part of a multifunctional device, such as a mobile phone, tablet computer, personal digital assistant, portable music/video player, wearable device, base station, laptop computer, desktop computer, network device, or any other electronic device. Electronic device 500 may be connected to one or more additional electronic device(s) 504 and one or more network device(s) 510 across a network 502. Illustrative networks include, but are not limited to, a local network such as a universal serial bus (USB) network, an organization's local area network, and a wide area network such as the Internet. According to one or more embodiments, electronic device 500 and the one or more additional electronic device(s) 504 may participate in a communication session in which each device may render an avatar of a user of the other client device.

Each of electronic device 500 may include a processor, such as a central processing unit (CPU) 530. Processor 530 may be a system-on-chip such as those found in mobile devices and include one or more dedicated graphics processing units (GPUs). Further, processor 530 may include multiple processors of the same or different type. Electronic device 500 may also include a memory, such as memory 540. Each memory may include one or more different types of memory, which may be used for performing device functions in conjunction with one or more processors, such as processor 530. For example, each memory may include cache, ROM, RAM, or any kind of transitory or non-transitory computer-readable storage medium capable of storing computer-readable code. Each memory may store various programming modules for execution by processors, including avatar module 585 and/or other application(s) 575. Electronic device 500 may also include storage, such as storage 550. Each storage may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage may include data for use in generating avatars and participating in a copresence environment, including enrollment data 555. Enrollment data 555 may be used to determine eye tracking data or the like.

Further, enrollment data 555 may be used to generate avatar data for a user of the electronic device 500.

Electronic device 500 may also include one or more cameras, such as cameras 518, or other sensors, such as eye tracking sensor 560. In one or more embodiments, each of the one or more cameras 518 may be a traditional RGB camera, depth camera, infrared camera, or the like. Further, each of the one or more cameras 518 may include a stereo- or other multi-camera system, a time-of-flight camera system, or the like which capture images from which depth information of a scene may be determined. Each of electronic device 500 and additional electronic device(s) device 504 may allow a user to interact with extended reality (XR) environments. There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display devices 580 and 508 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Additional electronic device(s) 504 may include components which enable the devices to generate avatar data or other shared content in a copresence environment. As such, additional electronic device(s) 504 may include an avatar module 506 to generate avatar data. In one or more embodiments, each of the additional electronic device(s) may include one or more encoder(s) which can generate one or more data streams of avatar data or other content to be shared with the copresence environment. In some embodiments, a single encoder can be used to generate and transmit to a central server, such as network device(s) 510 a video data stream along with instructions or other indication to the network device(s) 510 as to how to reduce the data stream to a lower quality. In some embodiments, the additional electronic device(s) may include one encoder to encode the data stream to prepare the data stream to be reduced, and another encoder to encode the data stream at an original quality level.

The one or more network device(s) 510 may include, for example, a content management module 512 which manages data stream requests from receiver devices in the copresence session. The content management module 512 can retrieve the correct data stream for a given sender device and, if necessary, reduce the data stream prior to transmitting to the requesting device. In some embodiments, the network device(s) 510 may include one or more encoders to package and transmit the requested data stream(s) to the requesting device(s).

Figure 6:
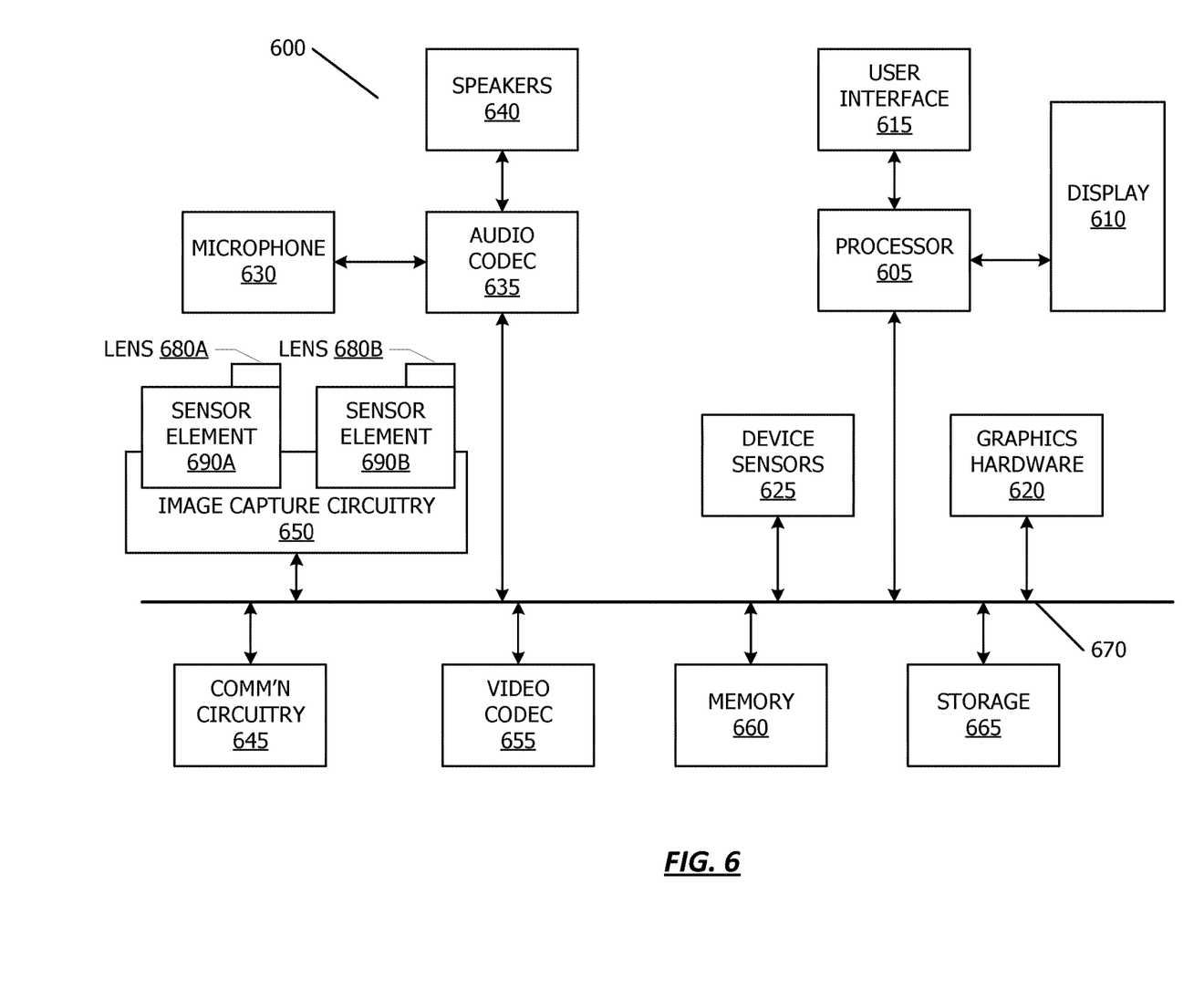
FIG. 6 shows, in block diagram form, a mobile device in accordance with one or more embodiments.

Referring now to FIG. 6, a simplified functional block diagram of illustrative multifunction electronic device 600 is shown according to one embodiment. The electronic device may be a multifunctional electronic device or may have some or all of the components of a multifunctional electronic device described herein. Multifunction electronic device 600 may include some combination of processor 605, display 610, user interface 615, graphics hardware 620, device sensors 625 (e.g., proximity sensor/ambient light sensor, accelerometer and/or gyroscope), microphone 630, audio codec 635, speaker(s) 640, communications circuitry 645, digital image capture circuitry 650 (e.g., including camera system), memory 660, storage device 665, and communications bus 670. Multifunction electronic device 600 may be, for example, a mobile telephone, personal music player, wearable device, tablet computer, or the like.

Processor 605 may execute instructions necessary to carry out or control the operation of many functions performed by device 600. Processor 605 may, for instance, drive display 610 and receive user input from user interface 615. User interface 615 may allow a user to interact with device 600. For example, user interface 615 can take a variety of forms, such as a button, keypad, dial, click wheel, keyboard, display screen, touch screen, and the like. Processor 605 may also, for example, be a system-on-chip, such as those found in mobile devices, and include a dedicated GPU. Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include one or more lens assemblies, such as lens 680A and 680B. The lens assembly may have a combination of various characteristics, such as differing focal length and the like. For example, lens assembly 680A may have a short focal length relative to the focal length of lens assembly 680B. Each lens assembly may have a separate associated sensor element 690A and 690B. Alternatively, two or more lens assemblies may share a common sensor element. Image capture circuitry 650 may capture still images, video images, enhanced images, and the like. Output from image capture circuitry 650 may be processed, at least in part, by video codec(s) 655, processor 605, graphics hardware 620, and/or a dedicated image processing unit or pipeline incorporated within communications circuitry 645. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random-access memory (RAM). Storage 665 may store media (e.g., audio, image, and video files), computer program instructions or software, preference information, device profile information, and any other suitable data. Storage 665 may include one more non-transitory computer-readable storage mediums, including, for example, magnetic disks (fixed, floppy, and removable) and tape, optical media such as CD-ROMs and DVDs, and semiconductor memory devices such as EPROM and EEPROM. Memory 660 and storage 665 may be used to tangibly retain computer program instructions or computer-readable code organized into one or more modules and written in any desired computer programming language. When executed by, for example, processor 605, such computer program code may implement one or more of the methods described herein.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-4, or the arrangement of elements shown in FIGS. 1 and 5-6 should not be construed as limiting the scope of the disclosed subject matter. The scope of the invention, therefore, should be determined with reference to the appended claims, along with the full scope of equivalents to which such claims are entitled. In the appended claims, the terms "including" and "in which" are used as the plain English equivalents of the respective terms "comprising" and "wherein".

The invention claimed is:

1. A non-transitory computer readable medium comprising computer readable code executable by one or more processors to:
   initiate a virtual communication session between a local device and a plurality of remote devices in a shared copresence environment, wherein each of the plurality of remote devices are transmitting a sending quality data stream in the virtual communication session;
   capture eye tracking data from one or more user-facing sensors on the local device;
   determine a gaze direction based on the eye tracking data;
   determine a region of interest for the local device based on the gaze direction, wherein the region of interest comprises a portion of the shared copresence environment;
   identify at least a first one of the plurality of remote devices for which a representation of the at least one of the plurality of remote devices is comprised in the region of interest;
   subscribe to, by the local device, a first quality data stream for at least the first one of the plurality of remote devices in accordance with the identification; and
   subscribe to, by the local device, a second quality data stream for at least a second one of the plurality of remote devices which are not identified in the region of interest.

2. The non-transitory computer readable medium of claim 1, further comprising computer readable code to:
   obtain updated eye tracking data;
   determine an updated gaze direction based on the updated eye tracking data;
   identify an updated region of interest based on the updated gaze direction; and
   in accordance with the second one of the plurality of remote devices comprised in the updated region of interest, modify the subscription to the first quality data stream for the second one of the plurality of remote devices.

3. The non-transitory computer readable medium of claim 2, further comprising computer readable code to:
in accordance with the first one of the plurality of remote device being outside the updated region of interest, modify the subscription to the second quality data stream for the first one of the plurality of remote devices.

4. The non-transitory computer readable medium of claim 1, wherein the first quality data stream comprises the sending quality data stream.

5. The non-transitory computer readable medium of claim 1, wherein the first quality data stream comprises a greater number of frames per second than the second quality data stream.

6. The non-transitory computer readable medium of claim 1, wherein the sending quality data stream comprises avatar data for a corresponding remote device.

7. A method comprising:
initiating, by a local device, a virtual communication session with a plurality of remote devices in a shared copresence environment, wherein each of the plurality of remote devices are transmitting a sending quality data stream in the virtual communication session;
determining, at the local device, a region of interest for the local device comprising a portion of the shared copresence environment;
identifying at least a first one of the plurality of remote devices for which a representation of the at least one of the plurality of remote devices is comprised in the region of interest;
selecting, by the local device, a first quality data stream for at least the first one of the plurality of remote devices based on the identification of the first one of the plurality of remote devices;
subscribing to, by the local device, the first quality data stream based on the selection; and
subscribing to, by the local device, a second quality data stream for at least a second one of the plurality of remote devices which are not identified in the region of interest.

8. The method of claim 7, wherein determining a region of interest for the local device comprises:
obtaining eye tracking data by the local device; and
determining a gaze direction of the shared copresence environment based on the eye tracking data,
wherein the region of interest is determined based on the gaze direction.

9. The method of claim 8, further comprising:
obtaining updated eye tracking data;
determining an updated gaze direction based on the updated eye tracking data;
identifying an updated region of interest based on the updated gaze direction; and
in accordance with the second one of the plurality of remote devices comprised in the updated region of interest, modifying the subscription to the first quality data stream for the second one of the plurality of remote devices.

10. The method of claim 7, wherein the sending quality data stream comprises avatar data for a corresponding remote device.

11. The method of claim 7, wherein determining a region of interest for the local device comprises:
determining a relative prominence score for each of the plurality of remote devices,
wherein the region of interest is determined based on the relative prominence score.

12. The method of claim 7, wherein the first quality data stream includes a data type that is excluded from the second quality data stream.

13. The method of claim 7, wherein the first quality data stream includes a first data type and wherein the second quality data stream includes a second data type.

14. The method of claim 7, wherein the first quality data stream for at least the first one of the plurality of remote devices is further selected based on resource availability at the local device.

15. A system comprising:
one or more processors; and
one or more computer readable medium comprising computer readable code executable by the one or more processors to:
initiate a virtual communication session between a local device and a plurality of remote devices in a shared copresence environment, wherein each of the plurality of remote devices are transmitting a sending quality data stream in the virtual communication session;
capture eye tracking data from one or more user-facing sensors on the local device;
determine a gaze direction based on the eye tracking data;
determine a region of interest for the local device based on the gaze direction, wherein the region of interest comprises a portion of the shared copresence environment;
identify at least a first one of the plurality of remote devices for which a representation of the at least one of the plurality of remote devices is comprised in the region of interest;
subscribe to a first quality data stream for at least the first one of the plurality of remote devices in accordance with the identification; and
subscribe to a second quality data stream for at least a second one of the plurality of remote devices which are not identified in the region of interest.

16. The system of claim 15, further comprising computer readable code to:
obtain updated eye tracking data;
determine an updated gaze direction based on the updated eye tracking data;
identify an updated region of interest based on the updated gaze direction; and
in accordance with the second one of the plurality of remote devices comprised in the updated region of interest, modify the subscription to the first quality data stream for the second one of the plurality of remote devices.

17. The system of claim 16, further comprising computer readable code to:
in accordance with the first one of the plurality of remote device being outside the updated region of interest, modify the subscription to the second quality data stream for the first one of the plurality of remote devices.

18. The system of claim 15, wherein the first quality data stream comprises the sending quality data stream.

19. The system of claim 15, wherein the first quality data stream comprises a greater number of frames per second than the second quality data stream.

* * * * *